United States Patent [19]

Ferguson

[11] Patent Number: 4,870,853

[45] Date of Patent: Oct. 3, 1989

[54] TOOL AND METHOD OF COINING CORNER BREAKS IN A STATOR OF A POWER STEERING VALVE

[75] Inventor: Donald E. Ferguson, Mentor, Ohio

[73] Assignee: Bethandale Corporation, Mentor, Ohio

[21] Appl. No.: 138,839

[22] Filed: Dec. 28, 1987

[51] Int. Cl.⁴ ............................................. H02K 15/00
[52] U.S. Cl. .................. 72/393; 29/157.1 R; 29/596; 29/609
[58] Field of Search ............ 72/393, 379, 399; 29/157.1 R, 596, 609

[56] References Cited

U.S. PATENT DOCUMENTS

| | | | |
|---|---|---|---|
| 3,762,041 | 10/1973 | Bair | 72/393 |
| 4,103,407 | 8/1978 | Elizade et al. | 29/157.1 R |
| 4,182,152 | 1/1980 | Vaill et al. | 72/393 |
| 4,516,471 | 5/1985 | Duffy | 91/375 A |
| 4,614,014 | 9/1986 | Ferguson | 29/157.1 R |
| 4,703,544 | 11/1987 | Saga | 29/157.1 R |

FOREIGN PATENT DOCUMENTS 0189028  10/1984  Japan ........................ 29/157.1 R

*Primary Examiner*—David Jones
*Attorney, Agent, or Firm*—Fay, Sharpe, Beall, Fagan, Minnich & McKee

[57] ABSTRACT

A method and apparatus for coining a valve sleeve member for a power steering valve. Arm portions of the coining apparatus are spread radially outward into associated oil grooves in the valve sleeve. A hardened coining land deforms corner breaks defined between the oil groove and the inner land region of the valve sleeve. The arm portions are moved radially inward again and the coining apparatus removed from the valve sleeve. Preferably, the coining apparatus includes a tapered recess extending along a substantial axial dimension of the apparatus. The arm portions are separated at one end of the coining apparatus and integrally joined together at the other end. Opposed groove pairs separate the coining lands from one another and facilitate receipt of the coining lands in the associated oil grooves.

6 Claims, 4 Drawing Sheets

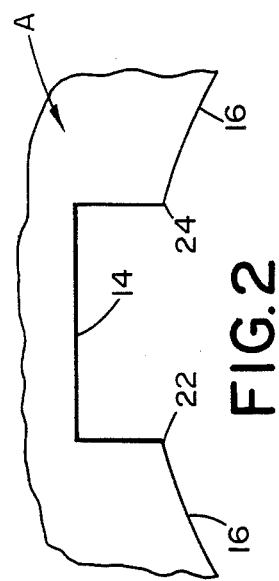
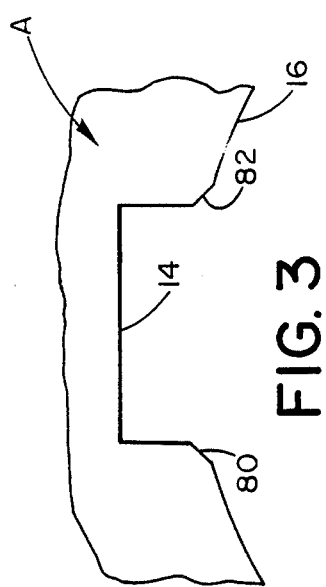
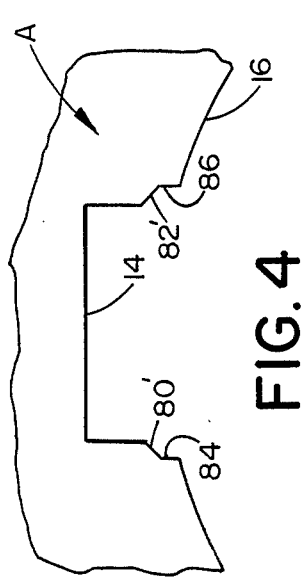
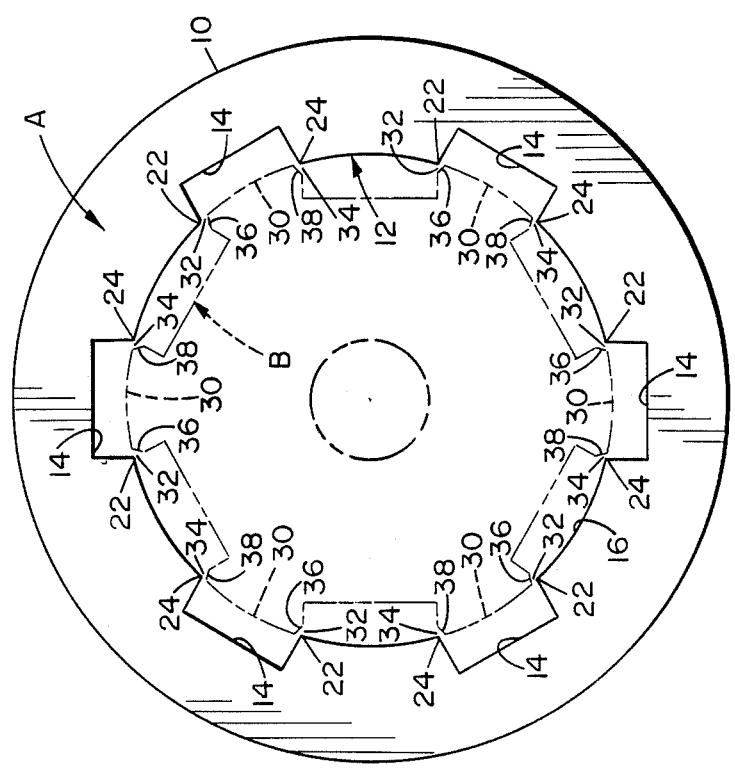

FIG. 7
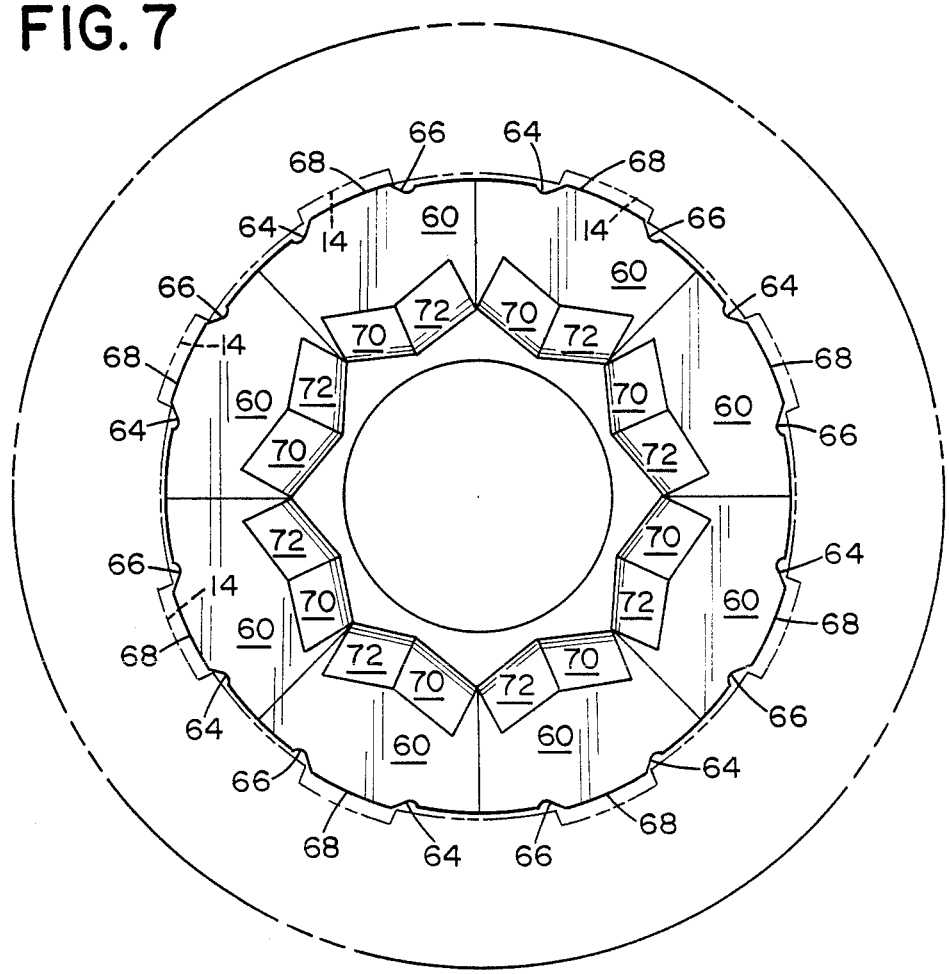
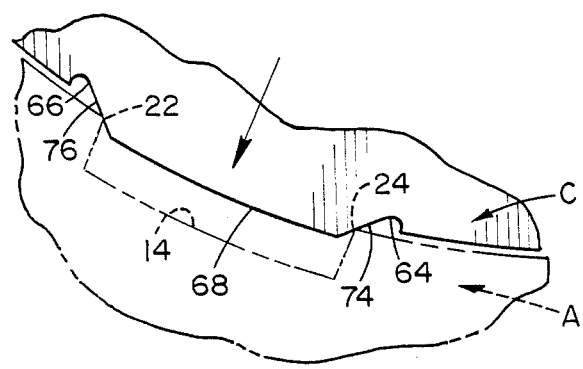
FIG. 8

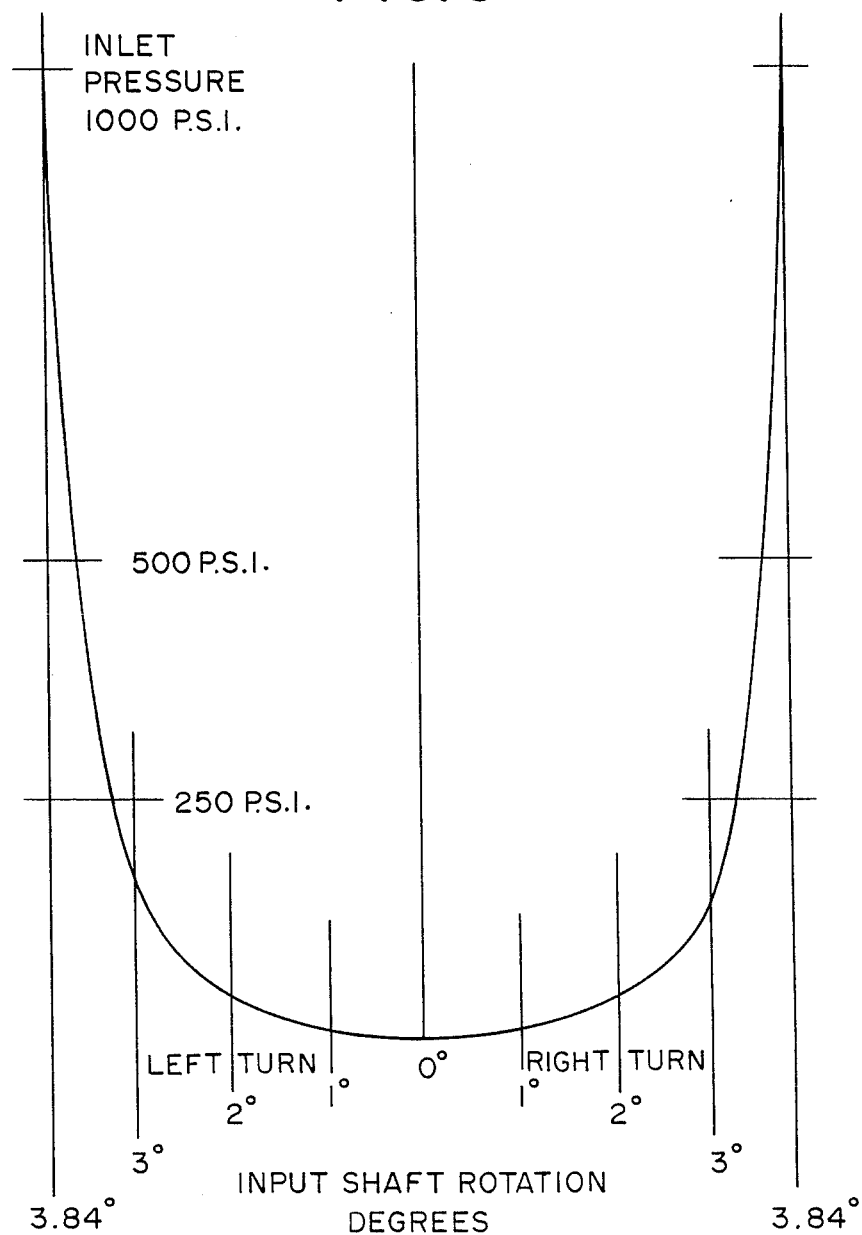

TOOL AND METHOD OF COINING CORNER BREAKS IN A STATOR OF A POWER STEERING VALVE

BACKGROUND OF THE INVENTION

This invention pertains to the art of manufacturing valve sleeves and more particularly to a tool and method of coining chamfers or corner breaks for oil grooves formed in the valve sleeve.

The invention is particularly applicable to forming corner breaks in a stator or valve sleeve of a power steering valve as employed in an automotive vehicle and will be described with particular reference thereto. However, it will be appreciated that the invention has broader applications and may be advantageously employed in other apparatus wherein a coining operation is required on an internal surface of a sleeve.

The tool for and method of coining an internal surface according to the subject invention are particularly applicable to the sleeve portion of a power steering valve, which steering valves are well known in the art. Rather than describe in detail the structure and operation of a conventional power steering valve, reference may be had to U.S. Pat. No. 4,516,471 issued to Duffy on May 14, 1985. That patent provides a detailed description of the environment for which the tool and method of coining is particularly applicable.

The noted patent is directed to providing chamfered lands on a rotor portion of a steering valve. The schematic representation of FIGS. 6 and 6A of that patent clearly demonstrate the chamfered regions on the rotor. Additionally, the valve sleeve of that patent is typically broached along its inner surface to form the necessary oil grooves. Chamfers are also formed at the corners of the groove during this broaching operation. This type of structure, though, necessarily requires use of end rings inserted at opposite ends of the valve sleeve in order that a sealed arrangement may be provided with the rotor. Further, the chamfers are formed on only one of a pair of opposed corner breaks defined by each groove. Prior art arrangements of this type require a significant amount of machining as well as the use of plural components to join together the sleeve and rotor.

One solution for the open ended slot arrangement resulting from a broaching operation on the rotor is described in U.S. Pat. No. 4,614,014 issued to Ferguson on Sept. 30, 1986. According to that method, a plurality of open-ended longitudinal slots are cut or broached into the valve sleeve and then end portions of the slots are wedged to deform the slot portions and form spaced and discontinuous protrusions that block the open-ended slots. Although this method has met with substantial success, it does not resolve the persistent problem of providing accurately positioned chamfers along the corner breaks of the oil grooves.

Typically, a valve sleeve is drilled or bored and the inner diameter tapped as necessary. The valve sleeve may be heat treated and is diamond-honed for particular sizing with an associated rotor. It is believed that a sliver burr is formed at the corner breaks of the oil grooves of the valve sleeve resulting from material being pushed into the groove during the diamond-honing operation. These burrs restrict the flow of oil through the steering valve, particularly to the oil grooves. Of course, any interference with fluid flow through the steering valve is highly undesirable.

As recognized in the Duffy patent noted above, the chamfered lands on the rotor and edges or corner breaks of the oil grooves reduce the turbulence in oil flow and provide an improved flow path from the pump means to the power assist chambers. Additionally, the chamfers reduce the hiss and noise associated with sharp or straight-edged surfaces. Still further, a better road feel results from use of the chamfered surfaces since the power assist is not abruptly altered but undergoes a smoother transition between neutral and assist positions.

It has been considered desirable to develop an accurate, cost effective manner of chamfering or forming alternative corner break arrangements in the valve sleeve of a power steering valve that overcomes the problems and shortcomings of prior art arrangements.

SUMMARY OF THE INVENTION

In accordance with the present invention, there is provided a method of coining a valve sleeve member and an apparatus for coining same.

According to a more limited aspect of the invention, the method of coining includes the steps of providing a valve sleeve having at least one oil groove, inserting a coining apparatus into the valve sleeve, and spreading the apparatus generally radially outward to deform edge portions of the oil groove.

According to a more limited aspect of the invention, the spreading step includes a closing one end of the coining apparatus and pressurizing the interior to spread a portion of the coining apparatus radially outward.

According to yet another aspect of the invention, the spread portion of the coining apparatus is retracted generally radially inward before removal from the valve sleeve.

According to an alternate aspect of the invention, the apparatus for coining the valve sleeve includes a recess extending axially inward from one end and terminating short of a second end. Plural land regions are circumferentially spaced along the axial length of the member with axially extending grooves interposed therebetween. Movable arm portions are defined along the length of the recess and are independently movable relative to one another.

According to a more limited aspect of the invention, the arm portions vary in stiffness along their axial length.

According to a still further aspect of the invention, the recess tapers radially inward as it extends axially from the first end toward the second end.

A principal advantage of the invention is the coining of chamfers or corner breaks on the internal surface of a valve sleeve.

Yet another advantage of the invention resides in the elimination of sliver burrs in a finished product.

A still further advantage is found in the economical and accurate manner in which the corner breaks are formed.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in the specification and illustrated in the accompanying drawings which form a part hereof, and wherein:

FIG. 1 is a cross-sectional view of a prior art stator or sleeve of a power steering valve receiving a rotor therein as shown in phantom;

FIG. 2 is an enlarged detailed view of a conventional oil groove formed in the valve sleeve;

FIG. 3 is an enlarged detailed view of an oil groove after the coining operation of the subject invention;

FIG. 4 is an enlarged detailed view of an alternative coined oil groove according to the subject invention;

FIG. 7 illustrates receipt of the coining apparatus in a valve sleeve shown in phantom;

FIG. 8 is an enlarged detailed viewed illustrating the radially outward movement of an arm portion of the coining apparatus into an associated oil groove shown in phantom; and FIG. 9 is a graphical representation of the relationship between pressure build-up and shaft rotation for the valve assembly.

DETAILED DESCRIPTION OF THE PREFERRED EMBODIMENT AND METHOD

Figures 5, 6:
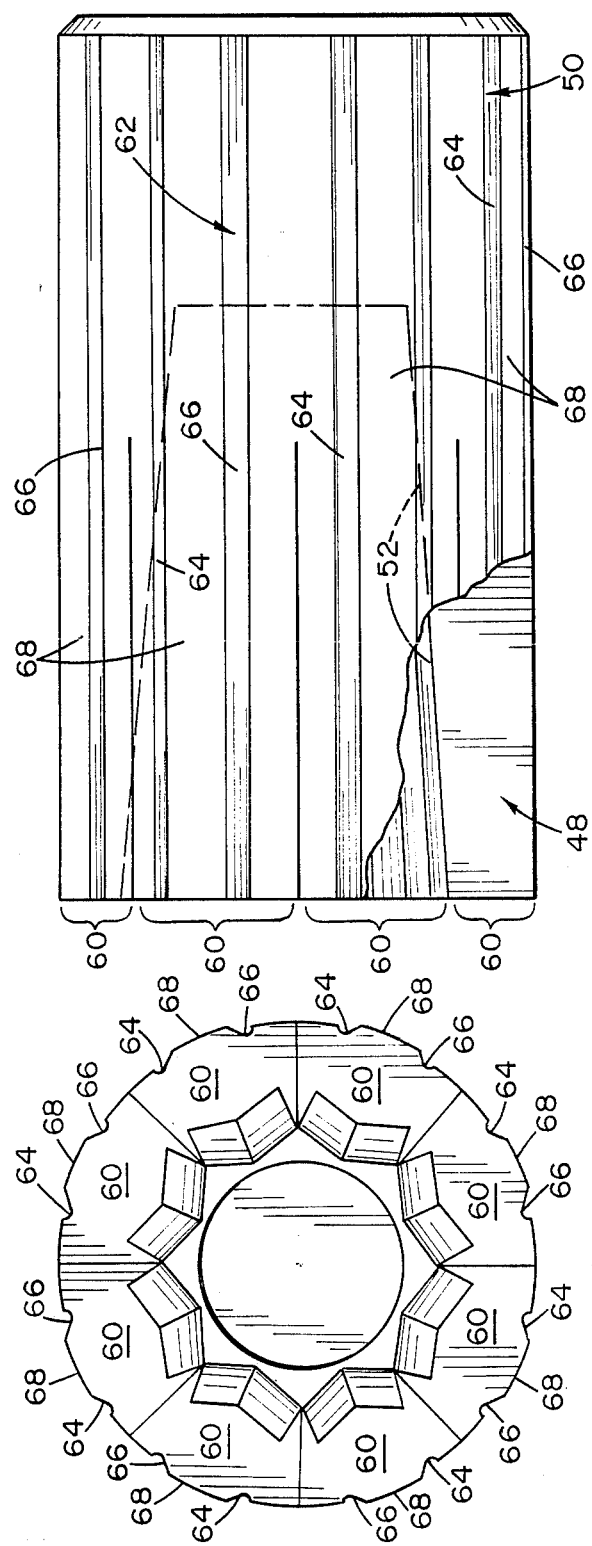
FIG. 5 is an end view of the coining apparatus preferably used to practice the method of the subject invention.
FIG. 6 is a side elevational view of the coining apparatus with selected portions thereof shown in cross-section.

Referring now to the drawings wherein the showings are for purposes of illustrating the preferred embodiment and method of the invention only and not for purposes of limiting same, the FIGURES show an apparatus C and method for coining accurate corner breaks in the valve sleeve A of a power steering apparatus.

More particularly, and with reference to FIGURE 1, a conventional valve sleeve A has an outer peripheral surface 10 and an inner peripheral surface 12. Plural oil grooves 14 are circumferentially positioned around the inner peripheral surface and extend radially outward into the valve sleeve. The grooves are circumferentially separated by inner lands 16. Although six oil grooves are illustrated in FIG. 1, typically anywhere from four to ten oil grooves may be formed in a conventional sleeve of a power steering valve. Opposed corner breaks 22, 24 are defined at the juncture of the oil grooves with the inner lands 16. As shown in FIGURE 2, many prior art arrangements utilize a sharp corner break between the oil groove and an associated inner land. Although a chamfered corner break is known, the means and method of the subject invention for producing an accurate chamfer is not.

Referring again to FIG. 1, a rotor B is shown in phantom in a neutral position in the associated sleeve A. Radially outward directed lands 30 are defined along the outer peripheral portion of the rotor. The lands have a circumferential dimension slightly less than the associated oil groove so that passages 32, 34 are formed between the corner breaks and lands. Particularly, chamfered edges 36, 38 are associated with each of the lands to facilitate fluid flow between the rotor and the corner breaks.

Typically, the oil grooves are cut through a broaching operation in the valve sleeve. Thereafter, a diamond-honing operation is completed to provide close tolerances between the valve rotor and sleeve. It is believed that this diamond-honing operation pushes slivers into the oil grooves where they remain and interface with fluid flow in the final assembled product. Essentially, the honing operation is a rubbing or pushing of stock which results in the minute slivers at the corner breaks. One of ordinary skill in the art can appreciate the increased hiss or noise resulting from interference with the fluid flow especially when tolerances are otherwise minimized.

The subject invention is designed to reduce the formation of slivers at the corner break regions so that fluid flow can pass uninterrupted to the oil groove. FIGS. 5 and 6 illustrate a preferred tool or arbor C for coining corner breaks in a valve sleeve. The tool is generally elongated having a first end 48 and opposed second end 50. A recess 52 extends axially inward from the first end toward the second end. Preferably, the recess has a radially inward tapering dimension as it extends axially inward from the first end. As particularly shown in FIG. 5, separate arm portions 60 extend substantially along the axial length of the tool. Each of the arm portions can move relative to an associated contiguous arm portion and all eight of the illustrated arm portions are joined together at a base region 62 defined at the second end of the tool.

The outer periphery of the tool includes associated pairs of grooves 64, 66 that extend longitudinally the full length of the tool. Each pair of first and second grooves are disposed on opposite sides a hardened coining land 68. The coining land has a circumferential peripheral dimension less than the oil groove so that it is received therein as particularly illustrated in FIGS. 7 and 8. The inner periphery of the tool defined by recess 52 is also uniquely configured to adapt the tool to generally radial movement. As particularly shown in FIGS. 5 and 7 each arm portion includes first and second tapered surfaces or facets 70, 72 that cooperate with the plug member (not shown) that has similarly arranged surfaces adapted for mating, abutting engagement. The tapered surfaces of each arm portion flare generally radially outwardly from each other and decrease as they extend axially toward the base region 62 of the tool. Of course, still other arrangements for engaging the recess of the tool can be used without departing from the scope and intent of the subject invention. Tapering edges 74, 76 extend between the coining land and the associated groove 64, 66 of each arm portion and abuttingly engage the corner breaks 22, 24. Upon radial outward movement of the separate arm portions, the edges push or coin the corner breaks to form chamfered surfaces 80, 82 as illustrated in FIG. 3. The coining operation is undertaken before the diamond-honing operation so that any sliver burrs that may be formed will not be pushed into the oil grooves or interfere with fluid flow.

Alternatively, the coined chamfered edges may have a stepped configuration as illustrated in FIGURE 4. The chamfered edges 80', 82' are recessed from the inner land 16 by means of radially extending connecting portions 84, 86. A suitable modification to the coining tool will be required to provide the stepped configuration. For example, the taper edges 74, 76 can include a generally radially extending surface interposed between the taper regions and the base of the respective grooves 64, 66. One of ordinary skill in the art will understand that still other arrangements may be used without departing from the scope and intent of the subject invention.

According to the method of the subject invention, the coining tool or apparatus C is closed at its second end, if not formed in such a manner, and the tool is inserted into the valve sleeve. The coining lands 68 are aligned with their respective oil grooves and pressure provided to the recess 52 to expand the arm portions radially outward. In a preferred arrangement, the radially outward pressure for expanding the arm portion is provided by a plug member (not shown) having an exterior surface configured for abutting, expanding engagement with the recess 52. The tapering configuration of the recess, in conjunction with a variable stiffness along the axial length of the arm portions, defines an opening, flowering arrangement, somewhat akin to a peeled banana opening outwardly when the tool is not constrained along its exterior surface. For reasons not completely known, the arm portions act in parallel along their axial length when the tool is coining the valve sleeve so that equal coining of the chamfers occurs along the axial length of the sleeve. In other words, the flowering opening becomes a parallel, radial movement of the arm portions. The individual arm portions press outwardly into the associated groove to form the chamfered edges 80, 82. Thereafter, pressure is reduced in the recess through removal of the tapered plug member so that the separate arm portions relax and move radially inward to their original position. The coining tool is then removed from the valve sleeve. Conventional manufacturing operation of the valve sleeve can then continue in accordance with known technology.

As a result of this coining operation, a more consistent set of shaft rotation and power curves result as shown in FIG. 9. The symmetry around the Y-axis is more apparent since the coining operation provides for precision defined passages between the rotor and sleeve of the power steering valve.

The invention has been described with reference to the preferred embodiment and method. Obviously modifications and alterations will occur to others upon a reading and understanding of the specification. It is intended to include all such modifications and alterations insofar as they come within the scope of the appended claims or the equivalents thereof.

Having thus described the invention, it is now claimed:

1. An apparatus for coning a valve sleeve member, said apparatus comprising;
   a generally elongated member having opposed first and second ends;
   a recess extending axially inward from said first end and terminating short of said second end;
   plural land regions extending substantially along the axial length of said member, said land regions defining a radially outermost peripheral portion of said member;
   axially extending grooves interposed between said land regions; and
   separate arm portions extending axially from said first end toward said second end, said arm portions integrally joined together at said second end and being independently movable relative to one another at said first end, said arm portions each including first and second tapered surfaces defined along an interior face for facilitating radial outward movement of said elongated member.

2. The apparatus as defined in claim 1 wherein said arm portions vary in stiffness along their axial dimension.

3. The apparatus as defined in claim 1 wherein said arm portions have an increased stiffness region adjacent the first end greater than a decreased stiffness region adjacent the second end.

4. The apparatus as defined in claim 1 wherein said recess tapers radially inward as it extends axially from said first end toward said second end.

5. The apparatus as defined in claim 1 wherein said first and second tapered surfaces on each arm portion flare generally radially outward from each other.

6. The apparatus as defined in claim 1 wherein said first and second tapered surfaces also taper radially inward as the recess extends axially inward toward said second end.

* * * * *